United States Patent
Jurato et al.

(10) Patent No.: US 11,525,745 B2
(45) Date of Patent: Dec. 13, 2022

(54) SYSTEM AND METHOD TO CALCULATE THE TEMPERATURE OF AN EXTERNAL ENVIRONMENT AIR CORRECTED FROM THE RADIATIVE ERROR, AS WELL AS SENSOR DEVICE USABLE IN SUCH SYSTEM

(71) Applicant: IOTOPON SRL, Cagliari (IT)

(72) Inventors: Juri Jurato, Cagliari (IT); Timoteo Galia, Monserrato (IT)

( * ) Notice: Subject to any disclaimer, the term of this patent is extended or adjusted under 35 U.S.C. 154(b) by 424 days.

(21) Appl. No.: 16/621,747

(22) PCT Filed: Jun. 28, 2018

(86) PCT No.: PCT/IB2018/054795
§ 371 (c)(1),
(2) Date: Dec. 12, 2019

(87) PCT Pub. No.: WO2019/003169
PCT Pub. Date: Jan. 3, 2019

(65) Prior Publication Data
US 2020/0141815 A1   May 7, 2020

(30) Foreign Application Priority Data
Jun. 28, 2017 (IT) .......................... 102017000072339

(51) Int. Cl.
*G01K 13/02* (2021.01)
*G01K 1/20* (2006.01)
(Continued)

(52) U.S. Cl.
CPC .............. *G01K 13/02* (2013.01); *G01K 1/20* (2013.01); *B60H 1/00807* (2013.01); *G01K 7/02* (2013.01);
(Continued)

(58) Field of Classification Search
CPC ............ G01K 13/02; G01K 1/20; G01K 7/02; G01K 7/16; G01K 7/42; G01K 13/024; B60H 1/00807
See application file for complete search history.

(56) References Cited

U.S. PATENT DOCUMENTS 2,970,475 A * 2/1961 Werner ................ G01K 13/028
374/138
6,655,833 B1 * 12/2003 Melin ...................... G01K 7/42
374/E7.042
(Continued)

FOREIGN PATENT DOCUMENTS

EP        1172639        1/2002

*Primary Examiner* — Nathaniel T Woodward
*Assistant Examiner* — Philip L Cotey
(74) *Attorney, Agent, or Firm* — Themis Law (57) ABSTRACT

A sensor device for calculating air temperature includes a support structure, to be traversed by the air and defining a seat having an air inlet and an air outlet, and a sensor arranged inside the seat to detect at least one first value and at least one second value of the air temperature that traverses the seat. The sensor device is configured so that, when detecting the first and second value, the air traverses the seat at a first and at a second speed, at which the sensor has a first and second heat transfer coefficient and first and second radiant power. The ratio between air speeds, heat transfer coefficients, or radiant powers is predetermined. The sensor device can be used with a data processing logic unit that calculates the air temperature starting from the first value, the second value, or the ratios between air speeds and radiant powers.

12 Claims, 3 Drawing Sheets

(51) Int. Cl.
  *G01K 7/02* (2021.01)
  *G01K 7/16* (2006.01)
  *G01K 13/024* (2021.01)
  *G01K 7/42* (2006.01)
  *B60H 1/00* (2006.01)

(52) U.S. Cl.
  CPC ............... *G01K 7/16* (2013.01); *G01K 7/42* (2013.01); *G01K 13/024* (2021.01)

(56) References Cited

U.S. PATENT DOCUMENTS

| | | | | |
|---|---|---|---|---|
| 6,809,648 | B1* | 10/2004 | Fleming | G01K 13/02 |
| | | | | 374/E13.006 |
| 7,249,881 | B2* | 7/2007 | Pipe | G01K 3/00 |
| | | | | 374/112 |
| 7,933,737 | B2* | 4/2011 | Gross | G01K 7/42 |
| | | | | 702/130 |
| 2001/0039806 | A1* | 11/2001 | Kawai | B60H 1/00742 |
| | | | | 374/E1.005 |
| 2005/0273292 | A1* | 12/2005 | Severson | G01K 13/02 |
| | | | | 374/E13.006 |
| 2006/0050767 | A1* | 3/2006 | Fleming | G01K 1/14 |
| | | | | 374/E13.006 |
| 2006/0133447 | A1* | 6/2006 | Severson | G01K 13/028 |
| | | | | 374/16 |
| 2008/0159354 | A1* | 7/2008 | Fleming | G01K 13/028 |
| | | | | 374/138 |
| 2013/0028291 | A1* | 1/2013 | Tobo | G01K 1/026 |
| | | | | 29/595 |
| 2015/0192479 | A1* | 7/2015 | Jochemczyk | G01K 1/20 |
| | | | | 374/141 |

* cited by examiner

SYSTEM AND METHOD TO CALCULATE THE TEMPERATURE OF AN EXTERNAL ENVIRONMENT AIR CORRECTED FROM THE RADIATIVE ERROR, AS WELL AS SENSOR DEVICE USABLE IN SUCH SYSTEM

FIELD OF THE INVENTION

The present invention generally applies to the field of meteorology, and in particular it regards a system and a method for calculating the air temperature of an external environment corrected from the radiative error.

The invention also regards a sensor device that can be used in such system.

State of the Art

Air temperature detection devices designated to be positioned in an outdoor environment generally comprising at least one temperature measuring sensor are known.

As known, thermal radiations impact such measuring, which is thus affected by a considerable error which entails a difference between the value indicated by the sensor and the actual air temperature. Such error is known as "radiative error".

To this end, the prior art devices provide for a box-shaped body for screening the sensor at least partly.

In order for the screening to have significant effect on the reduction of the radiative error, it is necessary for the box-shaped body to have a particular configuration, enable the through-flow of air and have considerable dimensions.

Thus, besides providing a value affected by an at times sizeable radiative error, such device reveals considerable costs and overall dimensions.

SUMMARY OF THE INVENTION

An object of the present invention is to at least partly overcome the drawbacks illustrated above, by providing a sensor device, a method and/or a system for calculating the air temperature corrected from the radiative error, that is highly functional and inexpensive.

Another object of the invention is to provide a sensor device, a system and/or a method for calculating the air temperature with an extremely short response time.

A further object of the invention is to provide a sensor device to calculate the air temperature of small dimensions.

Another object of the invention is to provide a system and/or a method for calculating the air temperature in a precise and inexpensive manner.

This object, just like others that will be more apparent hereinafter, are attained by a sensor device, a system comprising such sensor device and a method as described, illustrated and/or claimed herein.

The dependent claims describe advantageous embodiments of the invention.

BRIEF DESCRIPTION OF THE DRAWINGS

Further characteristics and advantages of the invention will be more apparent in light of the detailed description of a preferred but non-exclusive embodiment of the invention, illustrated by way of non-limiting example with reference to the attached drawings, wherein.

DETAILED DESCRIPTION OF SOME PREFERRED EMBODIMENTS

With reference to the aforementioned figures, herein described is a system 1 for calculating the air temperature T of an external environment E, in particular an external environment E subjected to thermal radiation, for example solar radiation.

Figure 1:
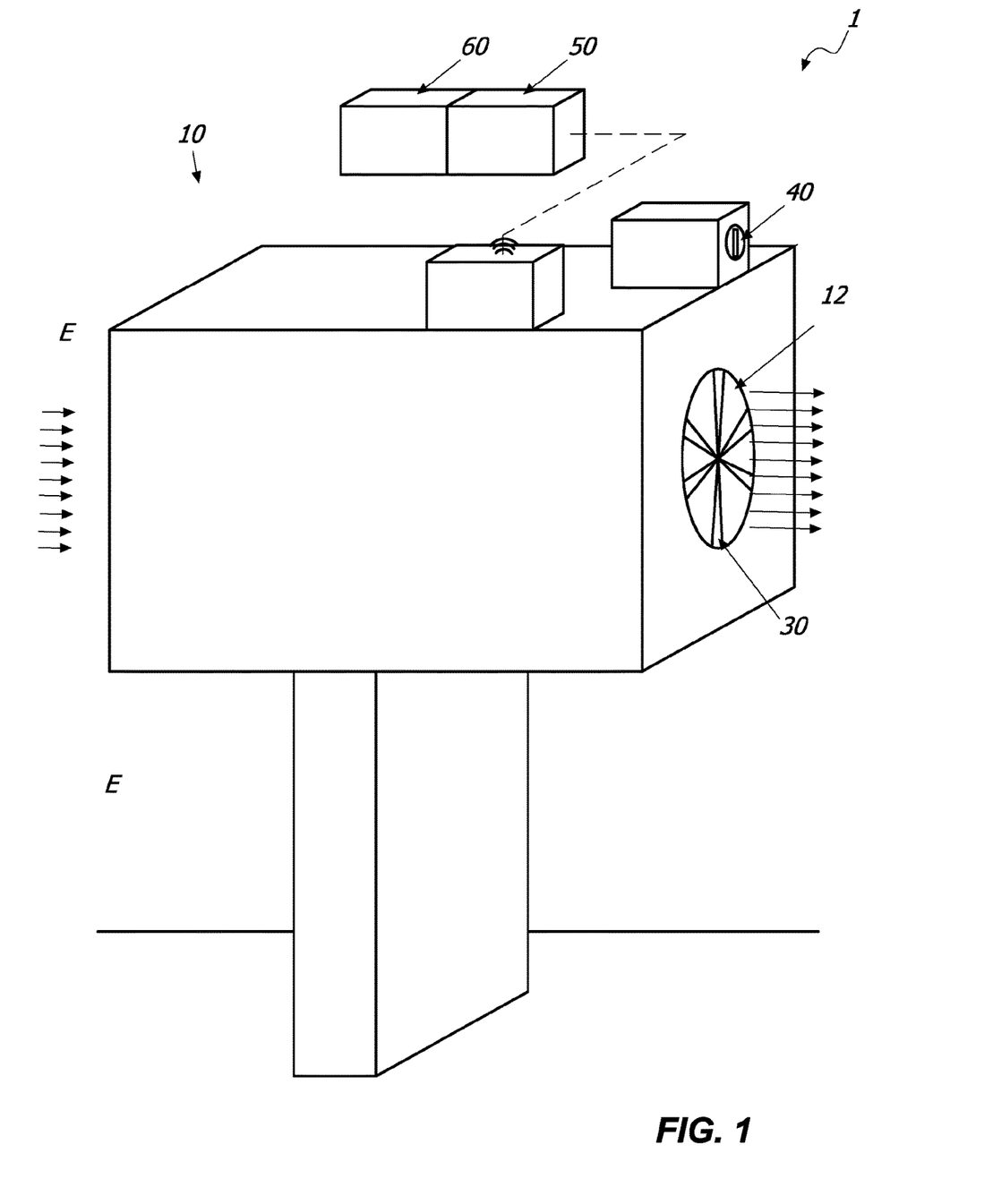
FIG. 1 is a schematic view of the system 1.

The system 1 may comprise at least one sensor device 10 positioned in the external environment E and at least one data processing logic unit 50 operatively connected with the sensor device 10 for processing the data detected by the sensor device 10 and calculating the air temperature T.

The device 10 may be positioned fixed in an external environment, for example a garden, a terrace or the like or it may be positioned on a mobile device, a vehicle for example.

The data processing logic unit 50 may be arranged in proximity of the sensor device 10 or it may be spaced from the latter and remote-connected for example by means of wireless connection.

The sensor device 10 may detect one of more temperature values $Ts1$, $Ts2$, $Ts3$, preferably at least two temperature values $Ts1$, $Ts2$, while the data processing logic unit 50 may calculate the air temperature T starting from such values $Ts1$, $Ts2$ and possibly $Ts3$ and from other values, as better specified hereinafter.

Even though hereinafter there will be described the detection of three temperatures, it is clear that the detected temperatures may vary in number with a minimum of two, without departing from the scope of protection of the attached claims.

The sensor device 10 may comprise a support structure 11 with a seat 12 designated to be traversed by the air of the external environment E.

In particular, the seat 12 may have an air inlet 13 and an air outlet 14. For example, the support structure 11 may be substantially cylindrical or parallelepiped-shaped, while the seat 12 may have a substantially longitudinal extension.

It is important that the geometry of the seat 12 be such to minimise the air turbulence of the external environment E which traverses it, i.e. in other words that the motion of the latter be of the laminar type as much as possible.

The sensor device 10 may suitably comprise sensor means 20 arranged inside the seat 12 to detect the temperature values $Ts1$, $Ts2$ and possibly $Ts3$ of the air that traverses the seat 12.

According to a particular aspect of the invention, each temperature value $Ts1$, $Ts2$ and possibly $Ts3$ of the air may be detected at a corresponding air speed $V1$, $V2$ and possibly $V3$. Such speeds $V1$, $V2$ and possibly $V3$ may be different from each other.

The sensor means 20 may comprise at least one temperature sensor 21 in at least one predetermined position.

Figure 2:
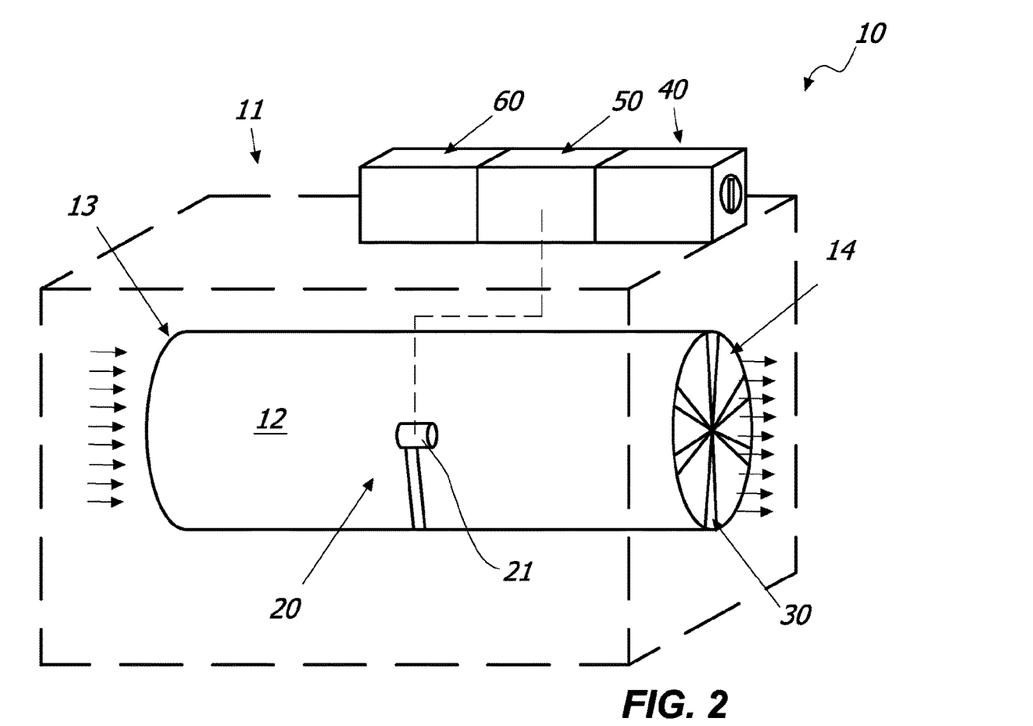
FIGS. 2 to 5 are schematised axonometric views of different embodiments of a sensor device 10.

In particular, according to a first embodiment illustrated in FIG. 2, the sensor means 20 may comprise only one temperature sensor 21.

Furthermore, the sensor device 10 may comprise means 30 for varying the air speed in the seat 12, in particular at the predetermined position of the sensor 21. For example, the means 30 may include a ventilator, a fan or the like which may be arranged at the inlet 13 and/or at the outlet 14 of the seat 12.

Adjustment means 40 acting on the air speed variation means 30 so as to enable the adjustment of the air speed may be suitably provided for.

Thanks to such characteristic, the sensor 21 may detect the temperature value Ts1 at speed V1 and the temperature value Ts2 at speed V2. Furthermore, the sensor 21 may also detect the temperature value Ts3 at speed V3.

Figure 3:
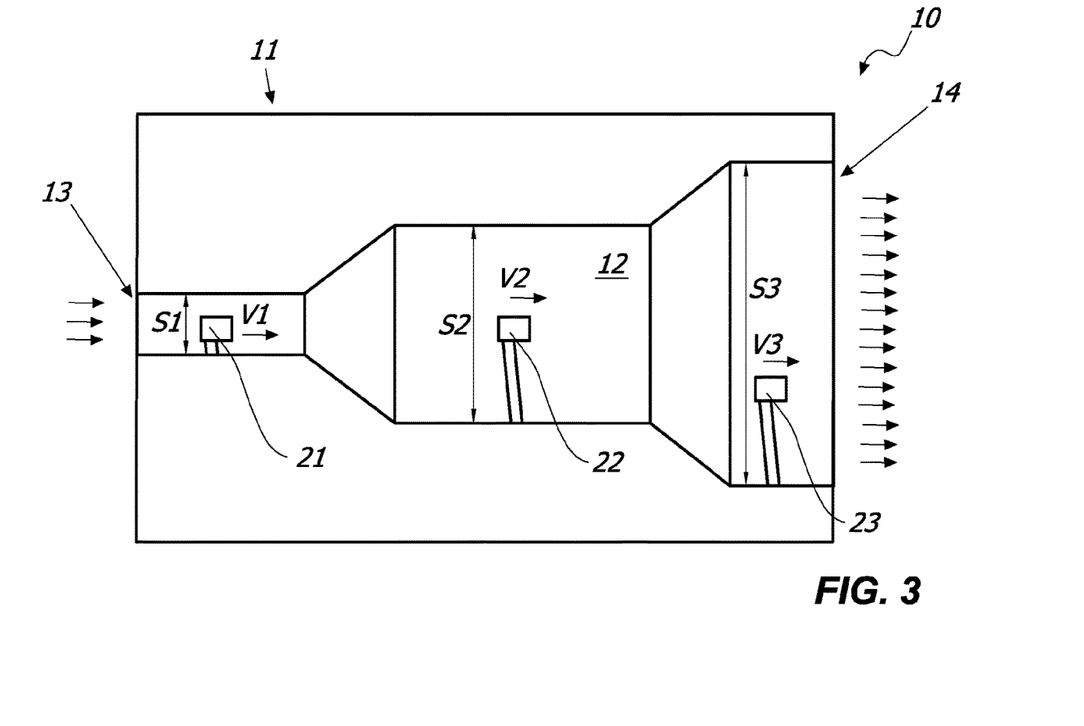
Figure 4:
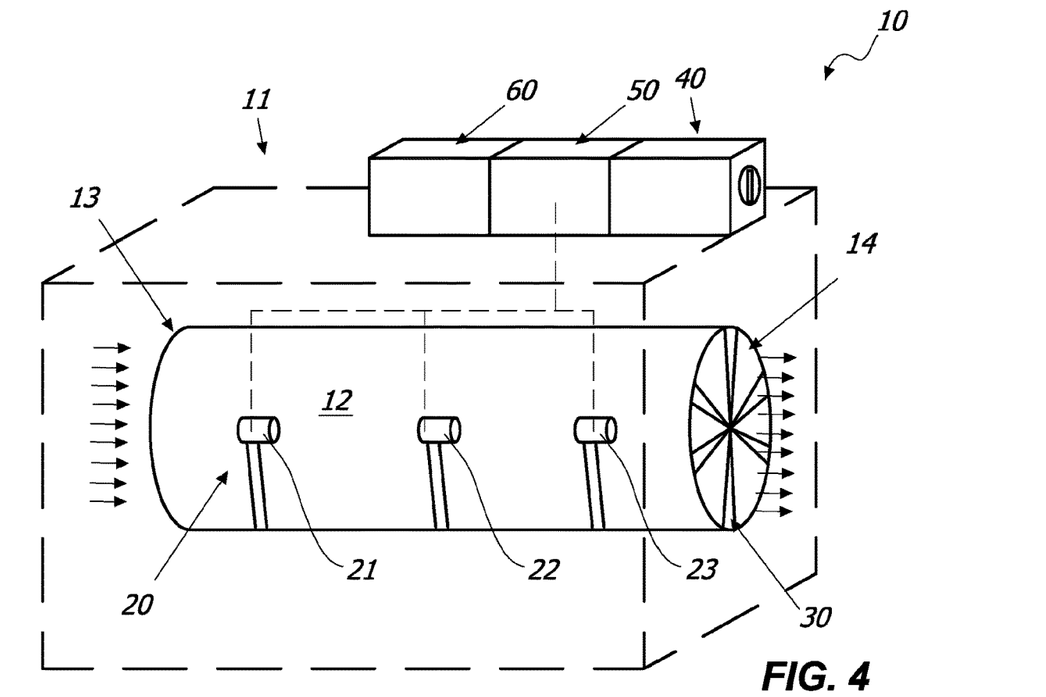

On the other hand, according to a different embodiment illustrated for example in FIGS. 3 and 4, the sensor means 20 may comprise a plurality of sensors 21, 22, 23 each arranged in a respective predetermined position in the seat 12 to detect a respective temperature value Ts1, Ts2, Ts3 of the air having a respective speed V1, V2, V3.

In this case, the support structure 11 may be configured so that the sensors 21, 22, 23 are all substantially exposed to the same thermal radiation.

In other words, the radiant power Prad may be substantially equal for all sensors 21, 22, 23. For example, the support structure 11 may be entirely made of the same material, while the seat 12 may have a substantially continuous lateral surface.

On the other hand, the radiant power Prad that impacts the sensors may be the different but predetermined in any case, as better outlined hereinafter.

The sensors 21, 22, 23 may be of any type, for example thermocouples or resistance thermometers (RTD: Resistance Temperature Detector) and they may be particularly small in size.

The sensors 21, 22, 23 may preferably be all identical to each other.

Even though sensors identical to each other will be described hereinafter, it is clear that the sensors may different from each other without departing from the scope of protection of the attached claims.

The sensors 21, 22, 23 may be mounted on a printed circuit board (PCB) or on any other similar device.

The seat 12 may suitably be configured so that the air speed V1, V2, V3 at the respective sensors 21, 22, 23 are different from each other when detecting the temperature Ts1, Ts2, Ts3.

For example, as shown in FIG. 3, the seat 12 may be substantially cylindrical-shaped and it may have section variations at the position of the sensors 21, 22, 23. In other words, the seat 12 may have sections S1, S2, S3 different from each other so that the air has a respective speed V1, V2, V3 at the respective sensor 21, 22, 23.

The seat 12 may possibly have a geometric configuration such to enable the known "Venturi effect" and the sensors 21, 22 may be positioned so that the air impacts them with speeds V1, V2 different from each other, possibly with a predetermined and constant ratio between the speeds V1, V2.

It is clear that the speeds V1, V2, V3 at the respective sensor 21, 22, 23 may be different due to the geometry of the seat 12 and/or the presence of means 30 for varying the speed and/or the air speed.

Though it has been described that the geometry of the seat 12 and/or the presence of speed variation means 30 enable obtaining different speeds V1, V2, V3, it is clear that the air speed may be varied in any manner without departing from the scope of protection of the present invention.

Furthermore, the movement of air in the seat 12 may be promoted by the aforementioned means 30, or the sensor device 10 may be impacted by the wind or it may be mounted on a mobile device, a vehicle for example.

In any case, due to the fact that the geometry of the seat 12 is selected in a manner such that the air that traverses it has minimum turbulence, the geometry of the seat 12 will enable to predetermine the values of the ratios V1/V2, V1/V3, V2/V3 from among the speeds that impact the sensors 21, 22 and 23.

In other words, it may not be necessarily required to know the true value of the single speeds V1, V2 and V3 in that it may be sufficient to know the ratios between them, which can be predetermined once the geometry of the seat 12 is known.

For example, the ratio values V1/V2 may be equal to the inverse of the ratios of the through-flow sections of the air in proximity of the sensors, i.e. V1/V2=S2/S1.

On the other hand, guaranteeing an airflow with minimum turbulence, the geometry of the seat 12 may enable to predetermine the ratio values H1/H2, H1/H3, H2/H3 between the heat transfer coefficients of the sensors 21, 22 and 23 starting from the predetermination of speed ratios, as better outlined hereinafter.

Furthermore, still the configuration of the seat 12 may enable to predetermine the ratio values PRad2/PRad1, PRad3/PRad1, PRad3/PRad2 between the radiant powers that impact the sensors 21, 22 and 23.

To this end, for example, at the sensors 21, 22 and 23, the seat 12 may have a differentiated thickness or it may have the configuration of FIG. 5, as outlined hereinafter.

In the simplified hypothesis of detecting only two detected temperature values Ts1 and Ts2, the data processing logic unit 50 may calculate the temperature T of the air of the external environment E which traverses the seat 12 of the sensor device 10 corrected from the radiative error starting from such detected temperature values Ts1 and Ts2, from the ratio PRad2/PRad1 and from the ratio V1/V2 of from the ratio H1/H2.

It is clear that in case of detection of three temperature values Ts1, Ts2, Ts3 by the sensors 21, 22 and 23 the aforementioned calculation will be carried out starting from the ratio values among the aforementioned three speeds, heat transfer coefficient and ratio values.

The system 1 may comprise a storage unit 60 operatively connected with the data processing logic unit 50. In particular, the storage unit 60 may be arranged in proximity of the support structure 11 or it may be remote and connected with the data processing logic unit 50 by means of wireless connection.

The speeds V1, V2 may be possibly stored in the storage unit 60 so as to rapidly calculate such ratio V1/V2. On the other hand, the ratio V1/V2 and not the single speeds V1, V2 may be preferably stored in the storage unit 60.

As mentioned above, the temperature values Ts1, Ts2 and possibly Ts3 may be detected by the same sensor 21 or by different sensors 21, 22.

Described hereinafter are some examples of correlations that can be implemented by the data processing logic unit 50 in case of use of two sensors.

In such correlations:

Prad expresses the radiant power entering into the sensor; $Prad = \varepsilon * \sigma * (T_{ir})^4 + G * S$ IRout expresses the radiation exiting from the sensor; $IRout1 = \varepsilon * \sigma * (Ts1)^4$; $IRout2 = \varepsilon * \sigma * (Ts2)^4$;

H1, H2=convective heat transfer coefficient;

$\varepsilon$=emissivity of the sensor surface;

$\sigma$=constant of Stefan-Boltzmann;

$T_{ir}$=temperature seen from the sensor;

G=absorption coefficient of the sensor surface for solar radiation;

S=power density of the solar radiation.

Ts1, Ts2=temperature values detected by the sensors;

m=parameter;

H0=parameter.

As known, the temperature seen from the sensor $T_{ir}$ is the temperature of the external bodies which irradiate on the sensor.

Furthermore, in a per se known manner, the parameter H0 depends on the geometric and thermodynamic characteristics of the sensor which does not have to be known due to the fact that the formulae use H1/H2, while parameter m depends on the geometric and thermodynamic characteristics of the sensor and it may be predetermined by means of a simple calibration procedure, as explained hereinafter.

For example, the calibration procedure for determining parameter m may consist in subjecting the sensor to be characterised to constant thermal radiation in an environment with controlled temperature (known and constant) by carrying out two temperature detections Ts1, Ts2 at two different speeds whose ratio is known.

It is clear that the expression transfer coefficients H1, H2 is used to indicate convective heat transfer coefficients at the detection conditions of temperatures Ts1, Ts2 respectively.

The sensors 21, 22 may be substantially exposed to the same in-flowing radiative flow (PRad1=PRad2=PRad and Kr=PRad2/PRad1=1) and the seat 12 may be configured so that the ratio V1/V2 and thus the ratio H1/H2 are always constant irrespective of the in-flow speed of the air into the seat 12, while the data processing logic unit 50 may calculate the air temperature T by means of the correlations:

$$H1*(Ts1-T)=P\text{ Rad}-I\text{Rout1} \quad (1)$$

$$H2*(Ts2-T)=P\text{ Rad}-I\text{Rout2} \quad (2)$$

$$H1/H2=(V1/V2)^m \quad (3)$$

wherein
$H1=H0*V1^m$
$H2=H0*V2^m$

The first two formulae (1) and (2) show the equations of the thermal balance for the sensors 21 and 22, while the formula (3) shows the relationship between the ratio of the transfer coefficients H1/H2 and the ratio V1/V2. The parameter m may be stored in the storage unit 60.

The ratio H1/H2 may be possibly stored in the storage unit 60 so as to calculate the air temperature T by means of the correlations outlined above.

Using the formulae (1) (2) and (3) outlined above, the data processing logic unit 50 may calculate the temperatures T that are known V1, V2, m, Ts1 and Ts2.

On the other hand, should the speeds V1, V2 be higher than a predetermined threshold value, for example V1>0.5 m/s e V2>0.5 m/s, the respective output radiation IRout1, IRout2 may be substantially negligible as compared to the other terms of the correlations. Thus, the temperature T can be calculated precisely by means of the simplified correlations below:

$$H1*(Ts1-T)=P\text{ Rad} \quad (1a)$$

$$H2*(Ts2-T)=P\text{ Rad} \quad (2a)$$

$$H1/H2=(V1/V2)^m \quad (3)$$

and $$H1/H2*(Ts1-T)=(Ts2-T) \quad (4)$$

The correlations (3), (4) show the dependence of the temperature T on the ratio of the convective heat transfer coefficients H1/H2 and the dependence of the latter on the ratios of the speeds V and on the parameter m. The latter parameter may be stored in the storage unit 60 once predetermined in a manner similar to the one described above.

Using the formula (4), the data processing logic unit 50 may calculate the temperatures T that are known V1, V2, m, Ts1 and Ts2.

Should the temperature values Ts1, Ts2, Ts3 be detected at the respective speeds V1, V2, V3, the temperature T may be determined, without ignoring the terms IRout1, IRout2, IRout3, in a manner similar to the one described above adding the following correlations to the correlations (1), (2), (3) and (4) illustrated above:

$$H3*(Ts3-T)=P\text{ Rad}-I\text{Rout3} \quad (5)$$

$$H1/H3=(V1/V3)^m \quad (6)$$

$$IH2=(V1/V3)^m \quad (7)$$

Thanks to what has been described above, even in this case the air temperature T may be calculated by means of a limited number of detected parameters (Ts1, Ts2, Ts3) and stored and/or predetermined parameters (m and the ratios between the speeds V1, V2 and V3). Furthermore, the latter may be easily pre-determinable, as described above.

In particular, in order to pre-calculate the parameter m mentioned above, the sensor device 10 may be positioned in a controlled environment with known air temperature, so that the sensors 21, 22 and possibly 23 detect a respective temperature Ts1, Ts2 and possibly Ts3 at a respective known test speed (or at ratios between the speeds V1, V2 and possibly V3 known).

The seat 12 may be possibly configured so that the ratio H1/H2 between the convective heat transfer coefficients is constant, substantially equivalent to 1, i.e. the convective heat transfer coefficients H1, H2 may be substantially equal to each other, irrespective of the air inflow speed into the seat 12. For example, as shown in FIG. 2, the seat 12 may be substantially cylindrical-shaped with constant section. More in detail, should the ratio H1/H2 be equal to 1, the seat of the sensors be configured so as to predetermine a ratio Kr=PRad2/PRad1 different from 1 and the speeds V1, V2 be higher than 0.5 m/s, the air temperature T may be calculated by means of the following correlation, similar to the correlation (4):

$$(Ts2-T)/(Ts1-T)=Kr \quad (8)$$

Suitably, should the ratio H1/H2 be different from 1, the correlation (9) may remain valid as long as the parameter Kr is multiplied by the inverse of the same ratio H1/H2, according to the correlation:

$$(Ts2-T)/(Ts1-T)=Krh \quad (8a)$$

wherein:
Krh=(PRad2/PRad1)*(H1/H2).

The parameter Kr or Krh may be stored in the storage unit 60 and/or it may be predetermined by means of procedures of the per se known type.

The parameter Kr may be defined by the ratio of the radiant powers PRad on the respective sensors 21, 22:

$$Kr=(\varepsilon*\sigma*(T_{ir1})^4+G*S1)/(\varepsilon*\sigma*(T_{ir2})^4G*S2)=P\text{ Rad2}/P\text{ Rad1} \quad (9)$$

Such ratio PRad2/PRad1 may suitable be constant irrespective of the radiant power PRad that impacts the sensor device 10.

The ratio between the radiant powers PRad may be known and/or stored in the special unit 60 and it may be predetermined, as mentioned above.

Figure 5:
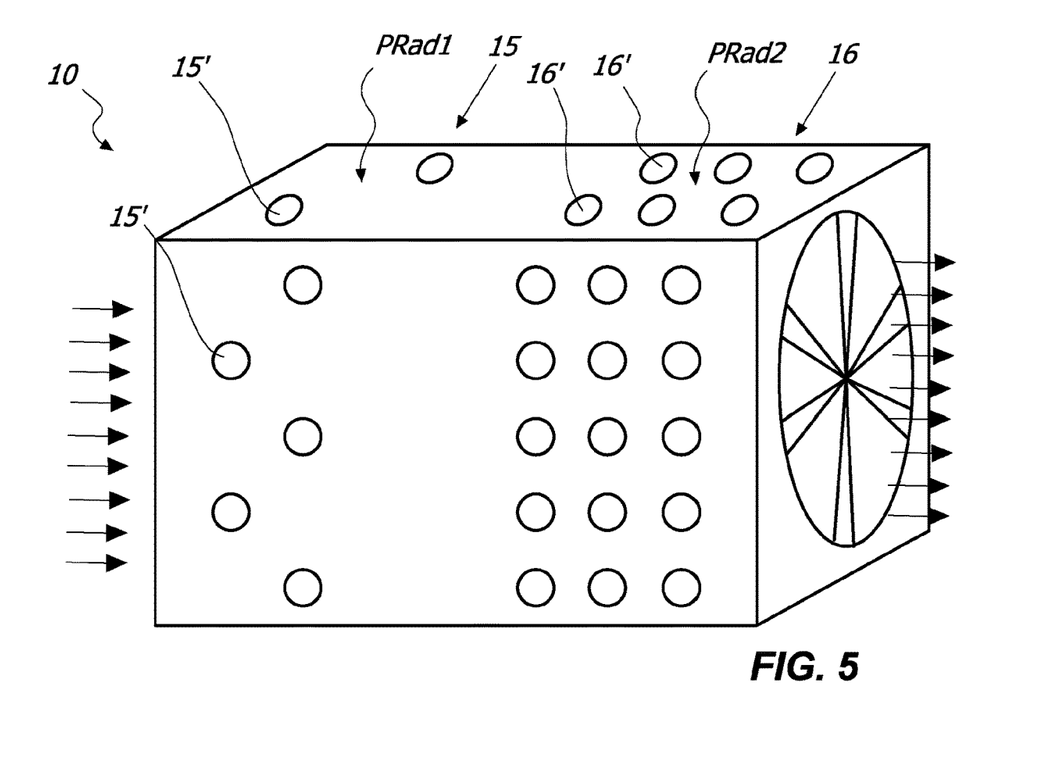

As schematically illustrated in FIG. 5, the seat 12 may be configured so that the ratio between the radiant power PRad1 that impacts the sensor 21 and the radiant power PRad2 that impacts the sensor 22, i.e. the ratio PRad2/PRad1, is predetermined.

For example, the seat 12 may have a drilled shielding structure with a zone 15 comprising a plurality of holes 15' and a zone 16 comprising a plurality of holes 16'. The holes 15',16' at the respective zones 15, 16 may be in a predetermined number different from each other.

The sensors 21 and 22 may suitable be arranged respectively at the zone 15 and 16 of the seat 12.

The zones 15, 16 may thus have a through-flow area defined by the sum of the area of the respective holes 15',16'. More in detail, each zone 15, 16 may have a respective surface density D, i.e. a ratio between an empty surface, i.e. the aforementioned through-flow area, and the solid surface. In particular, the ratio between the surface density D of the zone 15 and the surface density D of the zone 16 may be predetermined and may be substantially equal to the ratio between the respective radiant powers PRad.

In other words, the following correlation may be valid:

$$P\text{Rad}2/P\text{Rad}1 = D2/D1 \quad (10)$$

Possibly, should all holes 15',16' have the same surface, such ratio may be substantially equal to the ratio between the number of holes 15',16' of the respective zones 15, 16.

The ratio PRad2/PRad1 can be calculated thanks to such characteristic and thus Kr, without necessarily having to know the value of the radiant power PRad that impacts the single sensor 21, 22.

Thanks to such characteristic, the ration D1/D2 between the surface densities D, may be calculated initially and then the ratio PRad2/PRad1 may be calculated by means of the correlation (10), and the temperature T may be calculated by means of the correlation (8).

It is clear that the ratio between the radiant powers PRad2/PRad1 may be predetermined differently. In other words, the sensor device 10 may comprise per se known structures suitable to predetermine constant ratios of radiant powers PRad, for example zones 15 and 16 characterised by the same drilling density but with holes of different diameter and/or a different degree of transmittance and/or reflectance and/or absorbance, (for example made of different materials and/or thicknesses different from each other.

As described above, should temperature values Ts1, Ts2, Ts3 be detected at the respective speeds V1, V2, V3, and at respective radiant powers PRad1, PRad2 and PRad3 the temperature T may be equally determined in a manner similar to the one described above using one or more of the correlations illustrated above.

As a matter of fact, it is clear that the simplification hypotheses and the ensuing correlations described above for two temperature detection values Ts1, Ts2 just like applying to the correlations for determining one or more parameters may be equally applied with suitable modifications should temperature values Ts1, Ts2, Ts3 be detected.

Even through the present text describes the ratio of the speeds as V1/V2 and the ratio between the heat transfer coefficients as H1/H2 and the ratio between radiant powers as PRad2/PRad1, it is clear that the temperature T may be equally calculated should the ratio of the speeds, of the heat transfer coefficients and of the radiant powers be inverse, i.e. V2/V1, H2/H1 and PRad2/PRad1.

The invention is susceptible to numerous modifications and variants, all falling within the scope of protection of the attached claims. All details can be replaced by other technically equivalent elements, and the materials can be different depending on the technical needs, without departing from the scope of protection defined by the attached claims.

The invention claimed is:

1. A sensor device positionable in an external environment (E) subject to thermal radiation by traversing air, the sensor device being configured for use with at least one data processor (50) adapted to calculate a correct air temperature (T) of the external environment (E) starting from a detection of at least one first temperature value and at least one second temperature value (Ts1, Ts2) by the sensor device and to subsequently correct a radiative error of the detection, the sensor device (10) comprising:

a support structure (11) comprising at least a seat (12) configured to be traversed by the air of the external environment (E), said seat (12) having an air inlet (13) and an air outlet (14); and a sensor (20) arranged inside said seat (12) and configured to detect said at least one first value (Ts1) and said at least one second value (Ts2) of the air temperature of the external environment (E) that traverses said seat;

wherein said seat (12) is configured so that, when detecting said at least one first value (Ts1) and said at least one second value (Ts2) of the air temperature of the external environment (E), the air passes through said seat respectively at a first speed (V1) and at a second speed (V2), wherein said seat (12) has a geometry configured to minimize have a lower air turbulence than a turbulence of the air of the external environment that traverses said seat so that a motion of the air is laminar, and to have a first ratio (V1/V2) between said first speed (V1) and said second speed (V2) that is predetermined, wherein said seat (12) further has a predetermined configuration so that said sensor (20) is impacted by a first and a second radiant power (PRad1, PRad2) which have a third predetermined ratio (PRad2/PRad1) between the first radiant power and the second radiant power that is predetermined, so that the data processor (50) is adapted to calculate the correct air temperature (T) of the external environment (E) that traverses said seat (12) starting from:

said at least one first detected temperature value (Ts1) and said at least one second detected temperature value (Ts2); and from said third predetermined ratio (PRad2/PRad1) between said first radiant power (PRad1) and said second radiant power (PRad2); and from said first predetermined ratio (V1/V2) between said first speed (V1) and said second speed (V2), and wherein said sensor (20) comprises at least one temperature sensor (21), the sensor device (10) comprising means for varying air speed (30) in said seat (12) so that said at least one temperature sensor (21) detects said at least one temperature value (Ts1) at said first speed (V1) and said at least one second temperature value (Ts2) at said second speed (V2).

2. The sensor device according to claim 1, further comprising adjustment means acting on said means for varying the air speed (30) so as to enable an adjustment of the air speed.

3. The sensor device according to claim 1, wherein said means for varying the air speed (30) comprise a ventilator or fan arranged at said inlet (13) and/or said outlet (14) of said seat.

4. The sensor device according to claim 1, wherein said at least one temperature sensor comprises a first, a second, and a third temperature sensor, wherein some or all of said first temperature sensor (21), said second temperature sensor (22), or said third temperature sensor (23) are identical to each other.

5. The sensor device according to claim 1, wherein said at least one temperature sensor (21) comprises a first temperature sensor arranged in a first predetermined position for detecting said at least one first temperature value (Ts1), and a second temperature sensor (22) arranged in a second predetermined position to detect said at least one second temperature value (Ts2).

6. The sensor device according to claim 5, wherein said sensor (20) further comprises a third temperature sensor (23) arranged in said seat (12) in a third predetermined position for detecting at least one third value (Ts3) of the air temperature detected at a third speed (V3), said seat (12) having a geometry such that a ratio (V1/V3) between the first speed (V1) and the third speed (V3) and/or a ratio (V2/V3) between the first speed (V1) and the third speed (V3) are predetermined.

7. The sensor device according to claim 6, wherein said seat (12) has, at said first and said second predetermined position, or at said first, said second and said third predetermined position, a respective first and second through-flow section (S1, S2), or a respective first, second and third through-flow section (S1, S2, S3), which are different from each other so that the air thereat has said first and said second speed (V1, V2), or respectively said first, said second, and said third speed (V1, V2, V3).

8. The sensor device according to claim 5, wherein said sensor (20) has respectively a first and a second heat transfer coefficient (H1; H2), said seat (12) having a constant section so that a second ratio (H1/H2) between said first heat transfer coefficient (H1) and said second heat transfer coefficient (H2) is substantially equal to 1, and wherein said seat is configured so as to predetermine said third predetermined ratio Kr=PRad2/PRad1 different from 1.

9. The sensor device according to claim 5, wherein said seat (12) has a first zone (15) comprising a plurality of holes (15') defining a first through-flow area and a second zone (16) comprising a second plurality of holes (16') defining a second through-flow area, said first and said sensor (21, 22) being arranged respectively at said first zone (15) and said second zone (16) of said seat (12), a ratio between said first through-flow area and said second through-flow area defining said third predetermined ratio (PRad2/PRad1) between said first radiant power (PRad1) and said second radiant power (PRad2).

10. The sensor device according to claim 1, wherein said seat (12) has a first zone (15) made of a first material and a second zone (16) made of a second material different from the first material, a ratio between transmittances of said first and said second material defining said third predetermined ratio (PRad2/PRad1) between said first radiant power (PRad1) and said second radiant power (PRad2).

11. The sensor device according to claim 1, wherein said seat (12) has a first zone (15) having a first thickness (16) and a second zone having a second thickness different from the first thickness, a ratio between said first and said second thickness defining said third predetermined ratio (PRad2/PRad1) between said first radiant power (PRad1) and said second radiant power (PRad2).

12. A system for calculating a correct air temperature (T) of an external environment (E) subject to thermal radiation, corrected from radiative error, comprising:
at least one sensor device (10) comprising:
a support structure (11) comprising at least a seat (12) configured to be traversed by the air of the external environment (E), said seat (12) having an air inlet (13) and an air outlet (14); and a sensor (20) arranged inside said seat (12) and configured to detect said at least one first value (Ts1) and at least one second value (Ts2) of the air temperature of the external environment (E) that traverses said seat;
wherein said seat (12) is configured so that, when detecting said at least one first value (Ts1) and said at least one second value (Ts2) of the air temperature of the external environment (E), the air passes through said seat respectively at a first speed (V1) and at a second speed (V2),
wherein said seat (12) has a geometry configured to have a lower air turbulence than a turbulence of the air of the air of the external environment that traverses said seat so that a motion of the air is laminar, and to have a first ratio (V1/V2) between said first speed (V1) and said second speed (V2) that is predetermined,
wherein said seat (12) further has a predetermined configuration so that said sensor (20) is impacted by a first and a second radiant power (PRad1, PRad2) which have a third predetermined ratio (PRad2/PRad1) between the first radiant power and the second radiant power that is predetermined; and
at least one data processor (50) operatively connected to said at least one sensor device (10), the at least one processor (50) being configured to calculate the correct air temperature (T) of the external environment (E) by correcting the radiative error of the detection of said at least one first and at least one second temperature value (Ts1, Ts2) detected by said at least one sensor device,
wherein said data processor (50) is programmed to calculate the correct air temperature (T) of the external environment (E) starting from:
said at least one first temperature value (Ts1) and at least one second temperature value (Ts2); and from
said third predetermined ratio (PRad2/PRad1) between said first radiant power (PRad1) and said second radiant power (PRad2); and from
said first predetermined ratio (V1/V2) between said first speed (V1) and said second speed (V2),
wherein said sensor (20) comprises a first temperature sensor (21) and a second temperature sensor,
wherein:
if said first and sad second temperature sensors (21, 22) are exposed substantially to a same in-flowing radiative flow, said data processor (50) calculates the correct air temperature (T) with the following correlations:
H1*(Ts1−T)=PRad−IRout1 (1)
H2*(Ts2−T)=PRad−IRout2 (2)
H1/H2=(V1/V2)$^m$ (3)
wherein
H1=H0*V1$^m$
H2=H0*V2$^m$
and wherein:
PRad1=Prad2=PRad=ε*σ*(T$_{ir}$)$^4$+G*S;
IRout1=ε*σ*(Ts1)$^4$;
IRout2=ε*σ*(Ts2)$^4$;
H1, H2=convective heat transfer coefficient;
ε=emissivity of the sensor surface;
σ=constant of Stefan-Boltzmann;
Tir=temperature seen from the sensor;
Ts1, Ts2=temperature values detected by the sensors;
m=parameter;
G=absorption coefficient of the sensor surface for solar radiation;
S=power density of the solar radiation,
wherein if said first and said second speed (V1, V2) are greater than a predetermined threshold value, said data processor (50) calculates the correct air temperature (T) with the correlations:

$H1*(Ts1-T)=PRad$ (1*a*)

$H2*(Ts2-T)=PRad$ (2*a*)

$H1/H2=(V1/V2)m$ (3) and $H1/H2*(Ts1-T)=(Ts2-T)$ (4)

wherein H1/H2 is a second predetermined ratio, or, if said seat (12) is configured so that said second predetermined ratio (H1/H2) is equal to 1 and so that said predetermined third ratio (PRad2/PRad1) is different from 1, said first and said second speed (V1, V2) being greater than a predetermined threshold value, said data processor (50) calculates the correct air temperature (T) with a correlation:

$(Ts2-T)/(Ts1-T)=Kr$ (9)

wherein:

Kr=PRad2/PRad1 or if said seat (12) is configured so that said second predetermined ratio (H1/H2) and said third predetermined ratio (PRad2/PRad1) are different from 1, said first and second speed (V1, V2) being greater than a predetermined threshold value, said data processor (50) calculates the correct air temperature (T) using a correlation:

$(Ts2-T)/(Ts1-T)=Krh$ (9*a*)

wherein:

Krh=(PRad2/PRad1)*(H1/H2).

\* \* \* \* \*